(12) United States Patent
Saito et al.

(10) Patent No.: US 7,127,157 B1
(45) Date of Patent: Oct. 24, 2006

(54) RECORDING AND REPRODUCING APPARATUS

(75) Inventors: Shuji Saito, Chiba (JP); Takaaki Kato, Chiba (JP); Eiichi Takakura, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1294 days.

(21) Appl. No.: 09/914,075

(22) PCT Filed: Jun. 16, 2000

(86) PCT No.: PCT/JP00/03949

§ 371 (c)(1),
(2), (4) Date: Nov. 21, 2001

(87) PCT Pub. No.: WO01/01683

PCT Pub. Date: Jan. 4, 2001

(30) Foreign Application Priority Data

Jun. 30, 1999 (JP) .................... 11-184605

(51) Int. Cl.
H04N 7/26 (2006.01)
(52) U.S. Cl. .................... 386/124
(58) Field of Classification Search ........... 386/124
See application file for complete search history.

(56) References Cited

U.S. PATENT DOCUMENTS 5,953,488 A    9/1999  Seto
2003/0123842 A1*  7/2003  Saito et al. .......... 386/46
2005/0190296 A1*  9/2005  Kondo et al. .......... 348/565

FOREIGN PATENT DOCUMENTS

| EP | 0600495 A2 | 6/1994 |
|---|---|---|
| EP | 0756281 A2 | 1/1997 |
| JP | A60231977 | 11/1985 |
| JP | A6303574 | 10/1994 |
| JP | 07-177469 | 7/1995 |
| JP | A887840 | 4/1996 |
| JP | A8172608 | 7/1996 |
| JP | A8191425 | 7/1996 |
| JP | 8-331507 A | 12/1996 |
| JP | A9172612 | 6/1997 |

* cited by examiner

Primary Examiner—Thai Tran
Assistant Examiner—Heather R. Jones
(74) Attorney, Agent, or Firm—Birch, Stewart, Kolasch & Birch, LLP

(57) ABSTRACT

When the length of the vertical synchronizing signal constantly differs from that of the standard signal, writing of data into the shuffling memory and readout of data therefrom are asynchronous so that overwriting and mixture of data will occur. To deal with this a memory for three frames is used for the shuffling memory. This makes it possible to effect shuffling without causing data mixture.

8 Claims, 8 Drawing Sheets

FIG.5
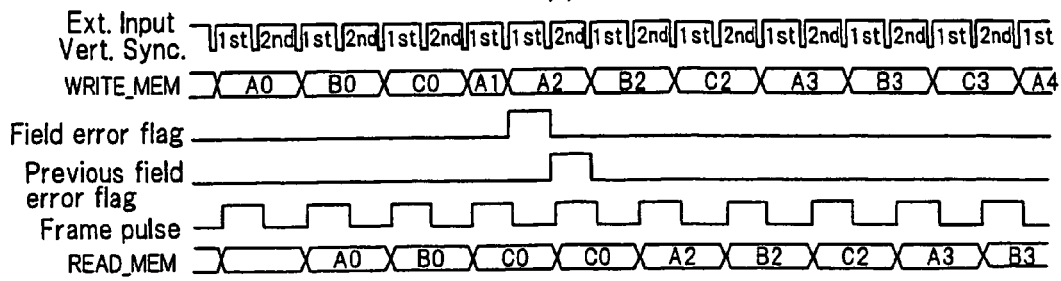
(a)
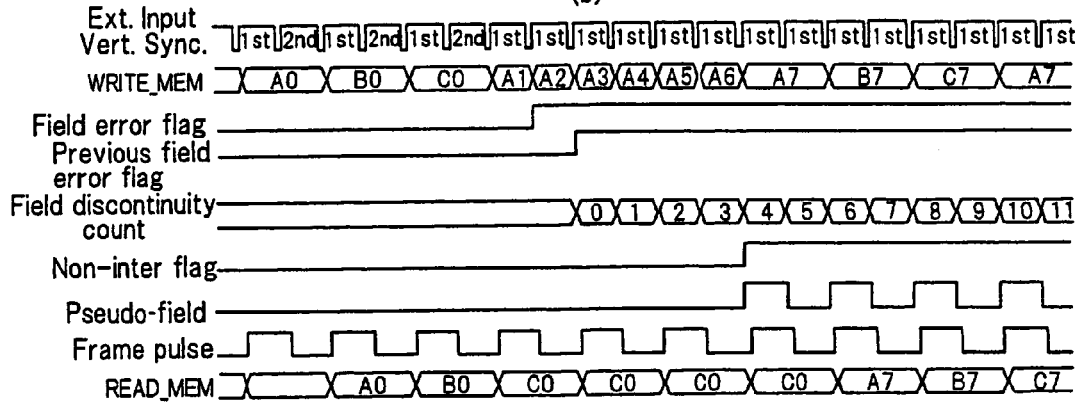
(b)
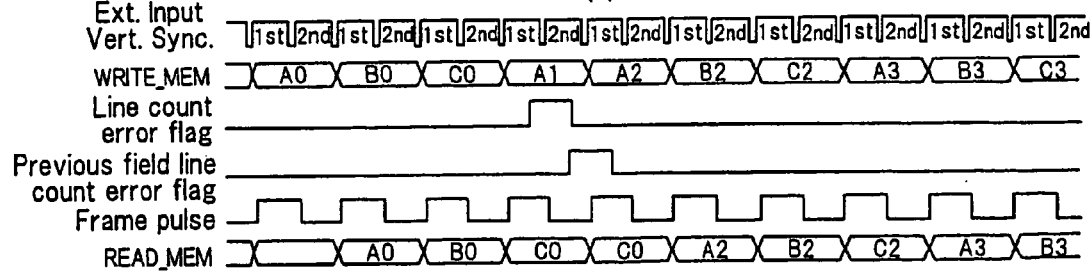
(c)
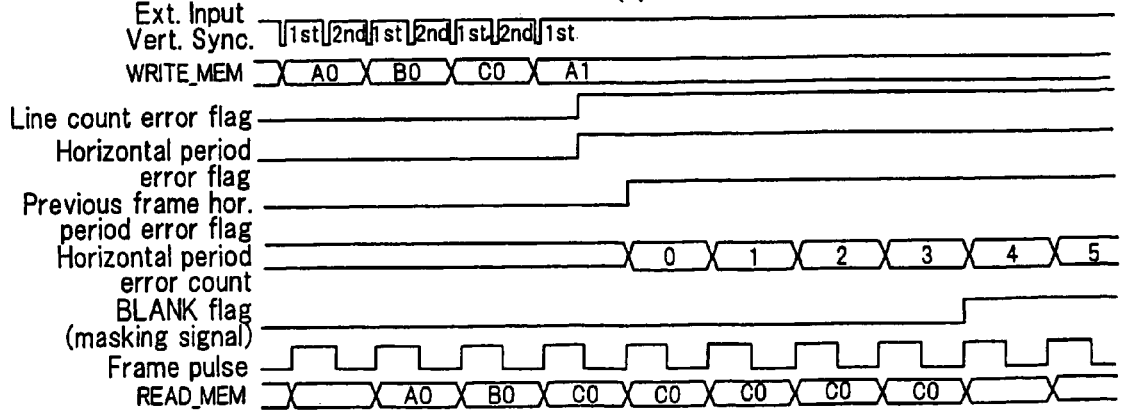
(d)

RECORDING AND REPRODUCING APPARATUS

This application is the national phase under 35 U.S.C. § 371 of PCT International Application No. PCT/JP00/03949 which has an International filing date of Jun. 16, 2000, which designated the United States of America and was not published in English.

TECHNICAL FIELD

The present invention relates to a digital signal apparatus for recording and reproducing digital video signals and relates to an apparatus for recording external input video signals.

BACKGROUND ART

With recent development of digital signal processing technologies, apparatus for recording and reproducing high-efficiency coded digital data of video signals etc., for example, digital video cassette tape-recorders (referred to hereinafter as DVC), have become popular.

A method for recording external input video signals such as composite signals, etc., with this recording and reproducing apparatus has been proposed in Japanese Patent Application Laid-Open Hei 7 No. 177469.

FIG. 8 shows one case of the above proposal. In FIG. 8, 101 designates an I/O block, 102 a VSP block, 103 a DRP block, 104 a control block, 105 an input video signal processing circuit, 106 a shuffling memory, 107 an orthogonal transformation circuit, 108 a framing circuit, 109 a PTG memory, 110 an encoder, 111 a decoder, 112 an ECC memory, 113 a deframing circuit, 114 an inverse orthogonal transformation circuit, 115 an output video signal processing circuit, 116 a synchronization separator circuit, 117 a synchronization detecting circuit, 118 a multiplexer, 119 a vertical and horizontal synchronization separator circuit, 120 an I/O control signal generator circuit, 121 an I/O PLL circuit, 122 a VSP control signal generator circuit, 123 a 2VSPPLL circuit, 124 a DRP control signal generator circuit, 125 a DRPPLL circuit, 126 a multiplexer, 127 a PBPLL circuit, 128 a reference synchronization generator and 129 a frame pulse generator circuit.

The recording and reproducing apparatus shown in FIG. 8 is comprised of I/O block 101 (input/output processor) as an input/output portion for handling input and output of video signals, VSP (Video Signal Processing) block 102 (compressing and expanding processor) for effecting predetermined processes on video data, a DRP (Data Recording Playback) block 103 (recording and reproducing processor) for performing recording and reproducing processes for recording and reproduction of video data and control block 104 for generating clock signals required for blocks 101 to 103 and performing the whole control of the apparatus.

Recording and reproduction of an externally input, composite signal, for example, using this recording and reproducing apparatus will be described hereinbelow.

To begin with, in control block 104, a synchronizing signal is extracted at synchronization separator circuit 116 from the input composite signal and the synchronizing signal is supplied to vertical and horizontal synchronization separator circuit 119 by way of multiplexer 118 when the synchronizing signal is detected by synchronization detecting circuit 117. Here, a synchronizing signal can be supplied to vertical and horizontal synchronization separator circuit 19 byway of multiplexer 118 even if no synchronization signal has been detected by synchronization detecting circuit 117 for a predetermined period of time.

In vertical and horizontal synchronization separator circuit 119, the synchronizing signal is separated into the vertical synchronizing signal and horizontal synchronizing signal. The phase of the horizontal synchronizing signal is drawn by I/OPLL circuit 121 to create a horizontal synchronizing signal of exact timing, which is supplied to I/O control signal generator circuit 120. This I/O control signal generator circuit 120 generates an I/O control signal whilst generating the 13.5 MHz clock signal which is recommended by the International Telecommunication Union (ITU-R) based on horizontal synchronization signal as a reference signal. These signals are supplied to I/O block 101.

The vertical synchronizing signal is obtained by frame pulse generator circuit 129 by detecting the frame length of video signal, and when the result falls within the range between ±1% of the standard frequency, frame pulses (to be referred to hereinbelow as the external input synchronizing signal) are generated based on the supplied vertical synchronizing signal. When the result falls equal to or greater than +1% or equal to or smaller than −1% of the standard vertical synchronizing signal, independent frame pulses (to be referred to hereinbelow as the internal free-running synchronizing signal) of +1% or −1% of the standard vertical synchronizing signal, respectively, are generated and supplied to 2VSPPLL circuit 123.

When the synchronizing signal is switched from the external input synchronizing signal to the internal free-running synchronizing signal, the counter for the internal running synchronizing signal is reset by the supplied vertical synchronizing signal, to thereby assure the continuity of the output frame pulses. On the other hand, for switching the synchronizing signal from the internal free-running synchronizing signal to the external input synchronizing signal, a window with a predetermined width is provided so that switching will be performed when the phase appears within the window, to thereby assure the continuity of the output frame pulses.

2VSPPLL circuit 123 draws the phase of the frame pulses so as to create frame pulses of exact timing, which are supplied to VSP control signal generator circuit 122. Provided from VSP control signal generator circuit 122 to VSP block 102 are a 18 MHz clock signal and a VSP control signal formed based on the 18 MHz clock signal.

DRPPLL circuit 125 draws the phase of the timing signal supplied from 2VSPPLL 123 so as to produce a 41.85 MHz clock signal set exactly in phase, which is supplied to DRP control signal generator circuit 124 by way of multiplexer 126. Supplied from DRP control signal generator circuit 124 to DRP block 103 are the 41.85 MHz clock signal and a DRP control signal produced based on the 41.85 MHz clock.

Next, in I/O block 101, the input composite signal is sampled and digitized by input video signal processing circuit 105 and further shaped into luminance data Y and chrominance data C. These signals are then written into shuffling memory 106 based on the 13.5 MHz clock signal supplied from control block 104.

In VSP block 102, based on the 18 MHz clock signal supplied from control block 104, the video data is read out from shuffling memory 106 and then the data is data compressed through orthogonal transformation circuit 107 and shaped into video data of one picture frame by framing circuit 108, which is added with the parity and then written into PTG memory 109.

In DRP block 103, the video data is read out from PTG memory 109 based on the 41.85 MHz clock signal supplied from control block 104 and is subjected to predetermined coding processes by encoder 110 and output to the recording head (not shown).

Next, the playback operation of this recording and reproducing apparatus will be described hereinbelow.

The video data is reproduced by a reproducing head (not shown) in the playback mode and supplied to decoder 111.

Here, in control block 104, the video data processed through the above decoder 111 (in DRP block 103) is supplied to PBPLL circuit 127, where a 41.8 gMHz clock signal is generated, which is supplied to DRP control signal generator circuit 124 via multiplexer 126. Supplied from DPR control signal generator circuit 124 to DRP block 103 are the 41.85 MHz clock signal and the DRP control signal. In DRP control signal generator circuit 124, the capstan speed is controlled based on the pilot signal recorded on the tape. That is, this allows the playback head to trace the recording track exactly, hence, it is possible to reproduce the video data correctly.

Reference synchronization generator 128 generates a synchronizing signal, which is supplied via multiplexer 118 to vertical and horizontal synchronization separator circuit 119. The phase of the vertical synchronizing signal separated by vertical and horizontal synchronization separator circuit 119 is drawn by 2VSPPLL circuit 123 by way of frame pulse generator circuit 129 so as to allow VSP control signal generator circuit 122 to generate a 18 MHz clock signal and a VSP control signal, which are supplied to VSP block 102.

Also, the phase of the horizontal synchronizing signal separated by vertical and horizontal synchronization separator circuit 119 is drawn by I/OPLL circuit 121 so as to allow I/O control signal generator circuit 120 to generate a 13.5 MHz clock signal and I/O control signal, which are supplied to I/O block 101.

In DRP block 103, the reproduced data is supplied to decoder 111 as above, where the data is subjected to the predetermined decoding process, and the decoded data is written into ECC memory 112 based on the 41.85 MHz clock signal supplied from control block 104 whilst being error-corrected.

In VSP block 102, the data is read out from ECC memory 112 based on the 18 MHz clock signal supplied from control block 104, and is supplied via deframing circuit 113 to inverse orthogonal transformation circuit 114, where the data is subjected to inverse orthogonal transformation based on the VSP control signal, and is written based on the 18 MHz clock signal into shuffling memory 106 so that one frame of video data is formed.

In I/O block 101, the video data is readout from shuffling memory 106 based on the 13.5 MHz clock signal supplied from control block 104 and is transformed into the composite data through output video signal processing circuit 115 based on the I/O control signal whilst being converted into analog form and is output externally.

In this way, the video data can be recorded in accordance with the external input synchronizing signal when the vertical synchronizing signal of the external input video data during recording falls within the range between ±1% of the standard frequency and can be recorded in accordance with the 1% incremented or decremented internal free-running synchronizing signal when the synchronizing signal falls equal to or greater than +1% or equal to or smaller than −1% of the standard frequency. Further, since upon switching from the external input synchronizing signal to the internal free-running synchronizing signal or vice versa, switching between the output vertical synchronizing signals can be performed keeping continuity, it is possible to make an accurate drum servo control on the rotational rate of the recording head.

Also in reproducing, the video data recorded on the tape can be correctly reproduced.

Nevertheless, since writing to and reading from the shuffling memory are asynchronous, if data reading starts before the completion of writing of one frame of data, the data before being overwritten, i.e., of the previous old frame will mix in the readout data. Further, if writing of the next frame of data starts before the completion of reading of one frame of data, the data after being overwritten, i.e., of the new frame will mix in the readout data. These phenomena are considered to occur frequently especially when the length of the vertical synchronizing signal constantly falls out of the range between ±1% of the standard signal. However, Japanese Patent Application Laid-Open Hei 7 No. 177469 has no reference to this problem.

Moreover, there is a possibility that video data of an external input might be recorded with a lack of order in some cases depending upon the types of input sources. Examples include discontinuity between fields when tape of scenes taken with breaks is reproduced and input, discontinuity between fields due to channel change during input from a tuner, increase or decrease in the number of lines in one frame, mixture of different types of frame data, continuous input of unpaired fields in non-interlaced signal input such as from a game machine etc., synchronous failures due to blank signal input and phase discontinuity of the synchronizing signal after recovery.

DISCLOSURE OF INVENTION

The present invention has been configured as hereinbelow in order to solve the above problems.

That is, a recording and reproducing apparatus for recording and reproducing digital video signals, includes: a memory for at least three frames; a writing means for writing externally input video data into the memory based on the synchronizing signal of the digital video signal; a first readout means for reading video data from the memory based on the synchronizing signal; a second readout means for reading video data from the memory based on a free-running synchronizing signal generated separately; and a page management means for performing management of frame pages in the memory by at least controlling the timing of writing video data into the memory and the timing of readout, based on the synchronizing signal, wherein the first readout means and second readout means are switched over from one to another in accordance with the instruction from the page management means.

Here, the page management means comprises: a frame length detecting means for detecting the difference of the frame length of the synchronizing signal from the predetermined standard value; a first internal counter for generating the first frame reference signal, which is greater than the standard value; a second internal counter for generating the second frame reference signal, which is shorter than the standard value; and a window pulse generator for generating a window pulse based on the synchronizing signal, and the operation is carried out so that, when the detection result of the frame length detecting means shows that the frame length agrees with the standard value, the first readout means reads out video data from the memory; when the frame length is greater than the standard value, the second readout means using the first frame reference signal, reads out video data from the memory; when the frame length is shorter than the standard value, the second readout means using the second frame reference signals, reads out video data from the memory; when the operation is switched from the first readout means to the second readout means, the first internal counter and second internal counter are reset; and switching from the second readout means to the first readout means is performed when the first frame reference signal or the second frame reference signal appears within the window pulse.

Further, it is preferred that the page management means comprises: a field determination means for determining the fields; and a discontinuity detecting means for detecting a discontinuity between fields, and when the discontinuity detecting means detects a field discontinuity in the fields determined by the field determining means, the page to be written in and the page to be read out in the memory are retained.

It is also preferred that the page management means comprises: a line count detecting means for detecting the number of lines in one frame, and when the line count detected by the line count detecting means differs from the previously set number of lines, the page to be written in and the page to be read out are retained.

Moreover, the page management means may comprise: a blank detecting means for detecting a blanked period of the externally input digital video signal; and a masking means for forcibly muting the video signal read out from the memory when the blank detecting means detects a blanked period.

Also, the page management means may comprise: an interlace mode determining means for determining whether the externally input digital video signal is of interlaced or non-interlaced data; and a field reallocating means which, when the interlace mode determining means has determined the externally input digital video signal to be of non-interlaced data, effects field reallocation to convert the data into interlaced format.

Here, it is preferred that the contents in the page to be written in and in the page to be read out in the memory are retained when the determined result from the interlace mode determining means changes.

Further, it is preferred that when the determined result from the interlace mode determining means changes, the determined result is monitored for a previously determined period of time, then the contents in the page to be written in and in the page to be read out in the memory are retained.

BRIEF DESCRIPTION OF DRAWINGS

FIG. 5 is a timing chart for explaining reading and writing of data when external input video data is disordered.

BEST MODE FOR CARRYING OUT THE INVENTION

One embodiment of the present invention will hereinbelow be described.

First, explanation will be made on shuffling of video data.

Orthogonal transformation is performed in order to compress and record video data. For this purpose, in order to reduce variations in the amount of information and improve the compression efficiency, shuffling (rearrangement of video data) is performed.

In order to simply effect the aforementioned shuffling process, a method (bank method) may be used wherein, with two memories each capable of storing one frame of video data provided, data is written into one of them while the previous frame data is being read from the other in the order different from that when the data was written in.

However, conventionally memory devices were high in price and the memory for two frames needed for the above bank method was too large in capacity and this method presented poor cost performance. To solve this problem, a shuffling process using a memory for one frame only was used.

Figure 4:
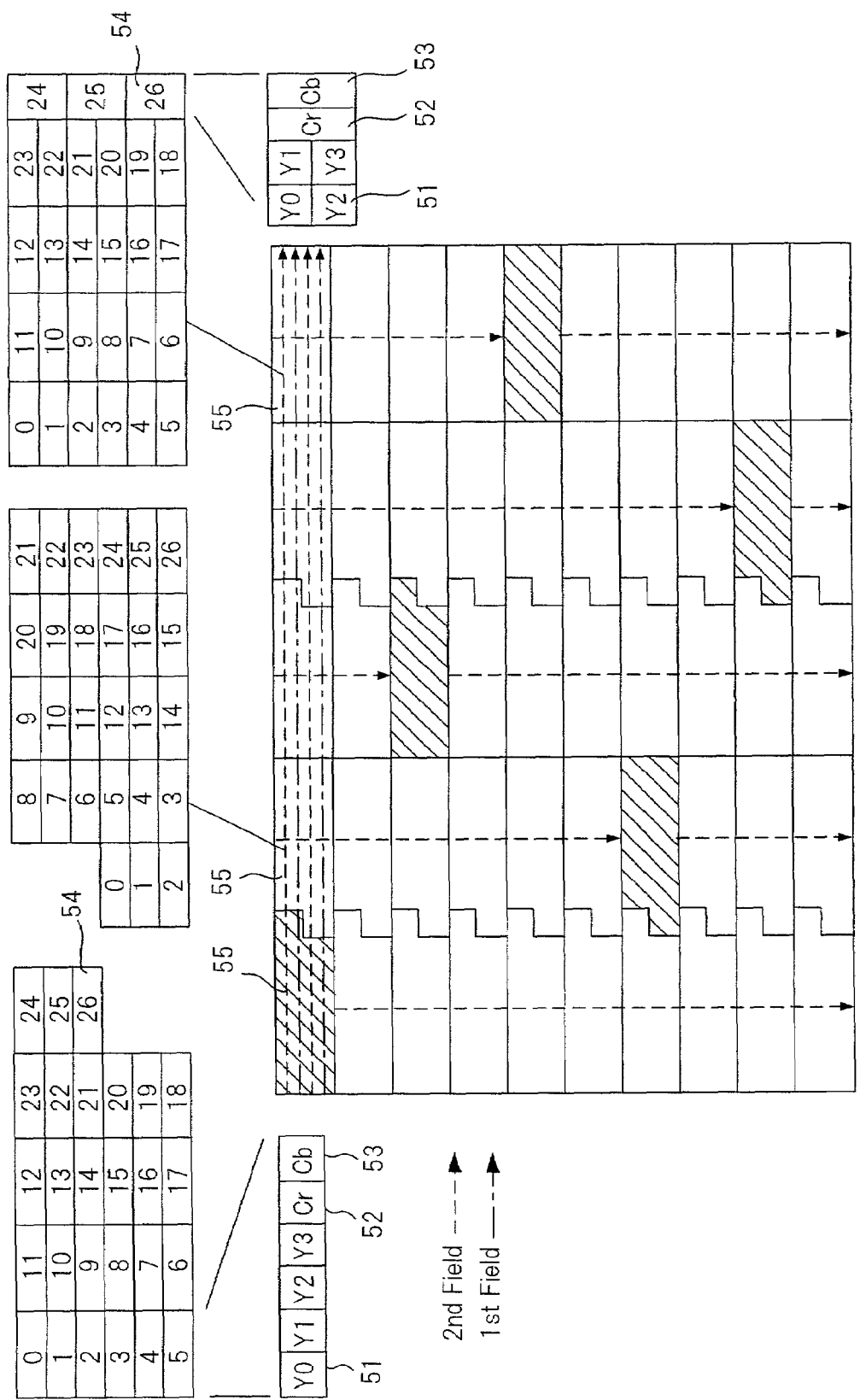
FIG. 4 is a diagram showing a memory configuration for one frame in the standard mode 525/60 system.

Referring to FIG. 4 one example of performing the shuffling process with a memory for one frame only will be described. FIG. 4 is a diagram showing a memory configuration for one frame in the standard mode 525/60 system. In FIG. 4, 51 designates a Y-signal DCT block, 52 a Cr-signal DCT block, 53 a Cb-signal DCT block, 54 a macro block, 55 a super block.

First, writing to the memory is preformed by writing the first field of data into 240 alternate, horizontal lines and then writing the second field of data into 240 horizontal lines in a similar manner.

Next, readout of the memory is performed by the smallest units, called DCT blocks, each made up of eight samplings in the horizontal direction and eight samplings in the vertical direction. Six DCT blocks, i.e., four Y-signal DCT block 51, one Cr-signal DCT block 52 and one Cb-signal DCT block 53 are grouped together to form one macro block 54. Further, twenty-seven macro blocks are grouped into one super block 55. Read out first is the super block 55 with hatching in FIG. 4. That is, Y-signal DCT blocks 51, namely Y0 to Y3, Cr-signal DCT block 52 and Cb-signal DCT block 53 are read out in order mentioned in macro block 54 units. When five super blocks 55 each having 0 to 26 macro blocks 54 have been read out, the position of reading moves down to the super block 55 in the next row and starts reading therefrom.

Then, the next frame of data is written into the super block 55 from which data has been read out. Thus, data is successively written into the blocks from which data has been read out, to thereby realize the shuffling process with memory for one frame only.

Next, the above problem, i.e., the phenomenon of mixture of data between two adjacent frames in the method of shuffling processing using memory for one frame only will be described. When the period of reading is shorter than the period of writing, writing gradually fails to keep up with the pace of reading so that data is read out from the super block 55 from which writing has yet to be done, thus data having the data from the pervious frame mixed therein is read out. When the period of reading is greater than the period of writing, reading gradually fails to keep up with the pace of writing so that data of the next frame is written into the super block 55 from which reading has yet to be done, thus data having the data for the next frame mixed therein is read out.

Thus, when shuffling is performed using memory for one frame only, if the period of writing and the period of reading differ from each other, data mixture of adjacent frames occurs. Further, since the rule of address rounding of writing/reading breaks down, there is a possibility that restoration cannot be obtained unless address rounding is reset, posing difficulties in using this method.

However, because of recent price reduction due to development of memories into large capacities and mass production, if an external memory is used, multipurpose memory has become advantageous in cost over dedicated memory for one frame only. Use of a 16 Mbit DRAM, which is currently most available with a favorable cost-effectiveness, makes it possible to provide memory space for three frames even for the standard mode 625/50 system (4.75 Mbits), needing the largest amount of data for one frame. As a result, it becomes possible to use the aforementioned bank method. Next, a comparison will be made between a process of shuffling based on the bank scheme using memory for two frames and that using memory for three frames, when the period of writing and that of reading differ from each other.

First, the case where the period of reading is shorter than the period of writing will be described using drawings.

Figure 6:
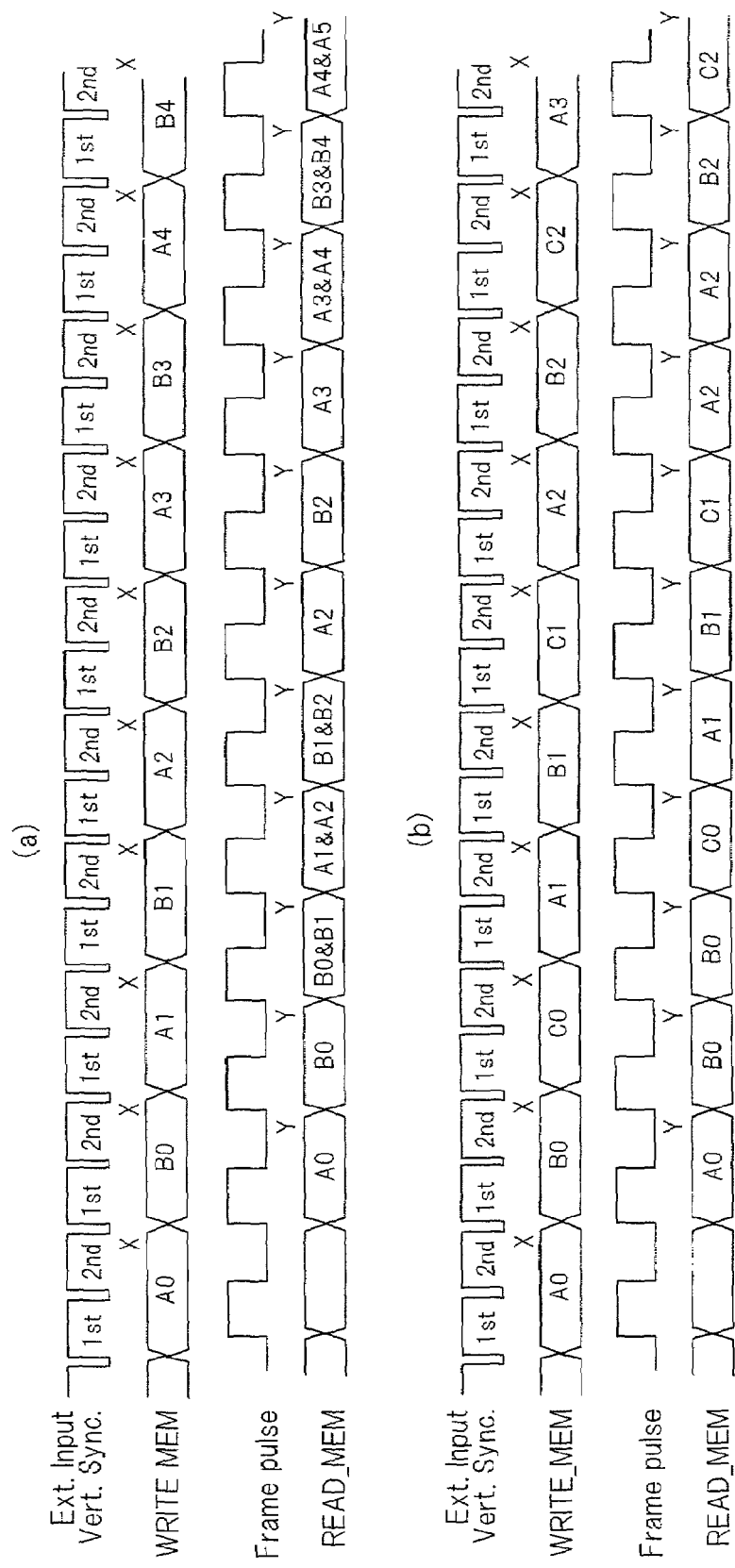
FIG. 6 is a timing chart for explaining reading and writing of data when the period of reading is shorter than the period of writing.

FIG. 6 shows the case where the period of reading is shorter than the period of writing, (a) showing the case using memory for two frames and (b) showing the case using memory for three frames. X in the drawings indicates the point (on 216th line in the second field in the standard mode) at which a sufficient enough amount of data has been written in to start reading while shuffling, and reading is performed for the data located downstream of the position X. Meanwhile, Y in the drawings indicates the point of reading end and if writing starts before this point, the data will become mixed up. It is also assumed that the first frame of the memory is A, the second frame is B and the third frame is C.

In FIG. 6(a), since A1 would be read out earlier before the point X at which writing of A1 is finished, B0 is read twice. Since writing of B1 starts before the point Y at which reading of B0 is finished, the read out data is the mixture of B0 and B1. Then, since reading of A1 is performed but writing of A2 starts before the point Y at which reading A1 is finished, the read out data is the mixture of A1 and A2. Similarly, for reading of B1, the read out data is the mixture of B1 and B2. Then, for reading of A2, the correct reading free from data mixture can be restored since the next writing of A3 will not start before the point Y of the reading end.

In FIG. 6(b), since C0 would be read out earlier before the point X at which writing of C0 is finished, B0 is read twice. Since writing of A1 starts after the end of writing of C0, the second reading of B0 is performed normally without any data mixture, and no mixture of data will occur after and downward.

Therefore, when shuffling is performed using memory for two frames, mixed up data is read out from the frame during the period in which reading and writing overlap. Depending upon the phase difference between the period of reading and the period of writing, mixed data portions and normal data portions appear periodically. In this case, a time lag equivalent to two frames exists within the data in the mixed data portion. When shuffling is performed using memory for three frames, no data mixture will occur by reading data twice.

Next, the case where the period of reading is greater than that of writing will be described using drawings.

Figure 7:
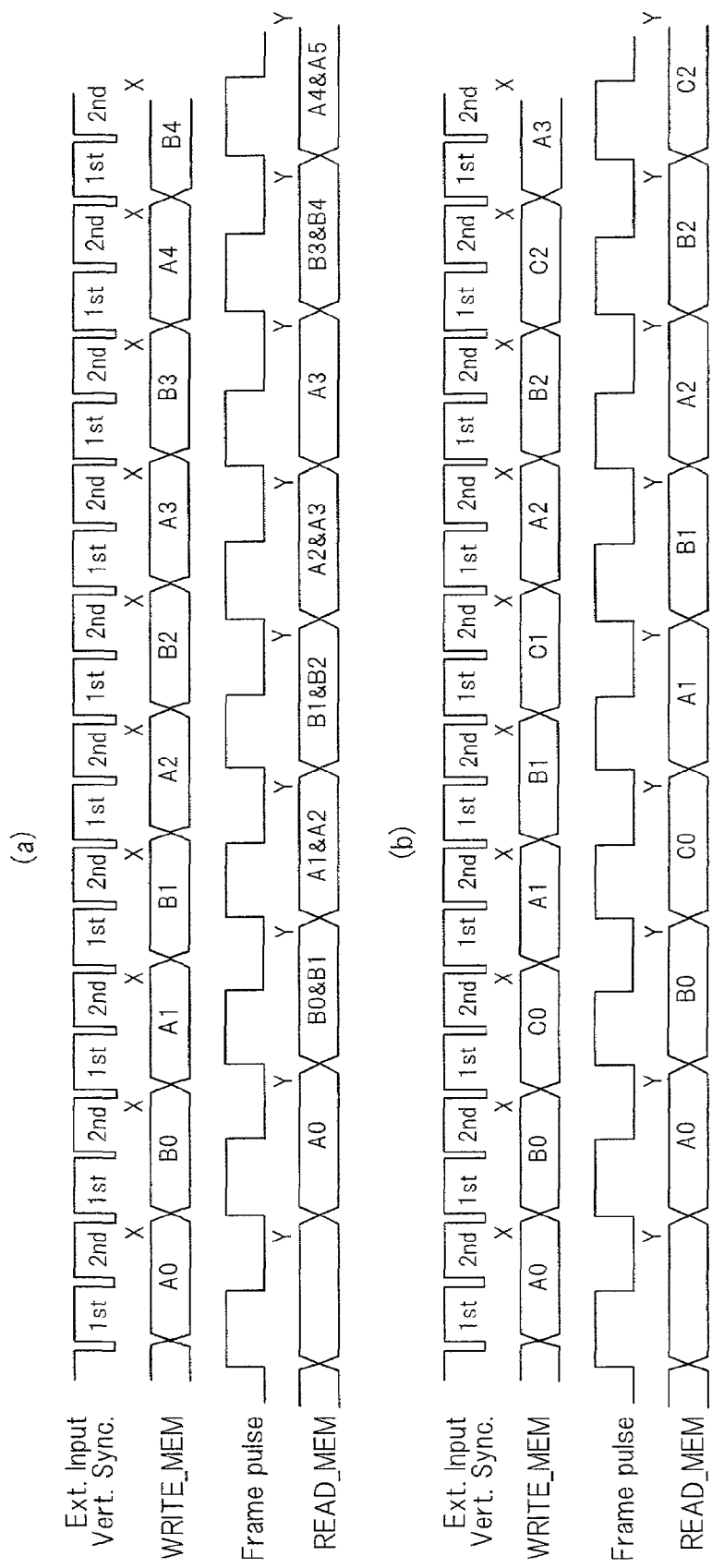
FIG. 7 is a timing chart for explaining reading and writing of data when the period of reading is greater than the period of writing.
Figure 8:
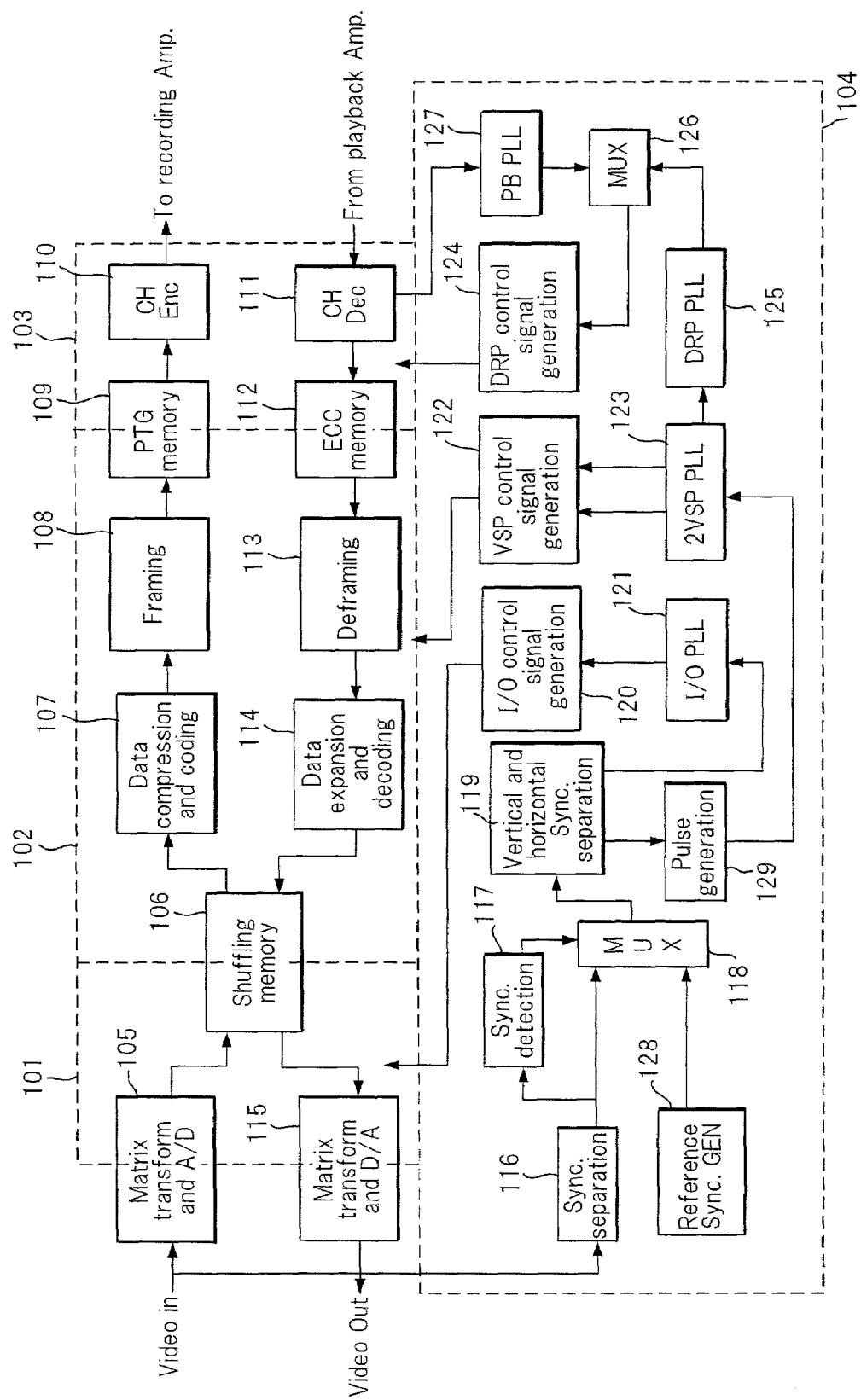
FIG. 8 is a block diagram showing a conventional recording and reproducing apparatus.

FIG. 7 shows the case where the period of reading is greater than that of writing, and (a) showing the case using memory for two frames and (b) showing the case using memory for three frames. X in the drawings indicates the point (on 216th line in the second field in the standard mode) at which a sufficient enough amount of data has been written in to start reading while shuffling, as in FIG. 6. Reading is performed for the data located downstream of the position X. Meanwhile, Y in the drawings indicates the point of reading end also as in FIG. 6, and if writing starts before this point, the data will become mixed up. It is also assumed that the first frame of the memory is A, the second frame is B and the third frame is C.

In FIG. 7(a), since writing of B1 starts before the point Y at which reading of B0 is finished, the read out data is the mixture of B0 and B1. Then, since reading of A1 is performed but writing of A2 starts before the reading end point Y, the read out data is the mixture of A1 and A2. Similarly, for reading of B1, the read out data is the mixture of B1 and B2, and for reading of A2, the read out data is the mixture of A2 and A3. For the next reading, since the start point of reading has passed by the point X at which writing of A3 is finished, A3 is read out without reading B2, whereby normal reading free from data mixture is restored.

In FIG. 7(b), after reading of B1, A2 is read out without reading C1 since the start point of reading of A2 has passed the point X at which writing of A2 is finished, whereby normal reading free from data mixture can be restored.

Therefore, when shuffling is performed using memory for two frames, mixed up data is read out from the frame during the period in which reading and writing overlap. Depending upon the phase difference between the period of reading and the period of writing, mixed data portions and normal data portions appear periodically. It should be noted that, in this case, a time lag equivalent to two frames exists within the data in the mixed data portion. When shuffling is performed using memory for three frames, no data mixture will occur by dropping data.

As described above, when writing to and reading from the shuffling memory are asynchronous, use of memory for three frames makes it possible to perform shuffling without any mixture of data.

Next, description will be made of a recording and reproducing apparatus used in the present embodiment using a shuffling memory for three frames.

Figure 1:
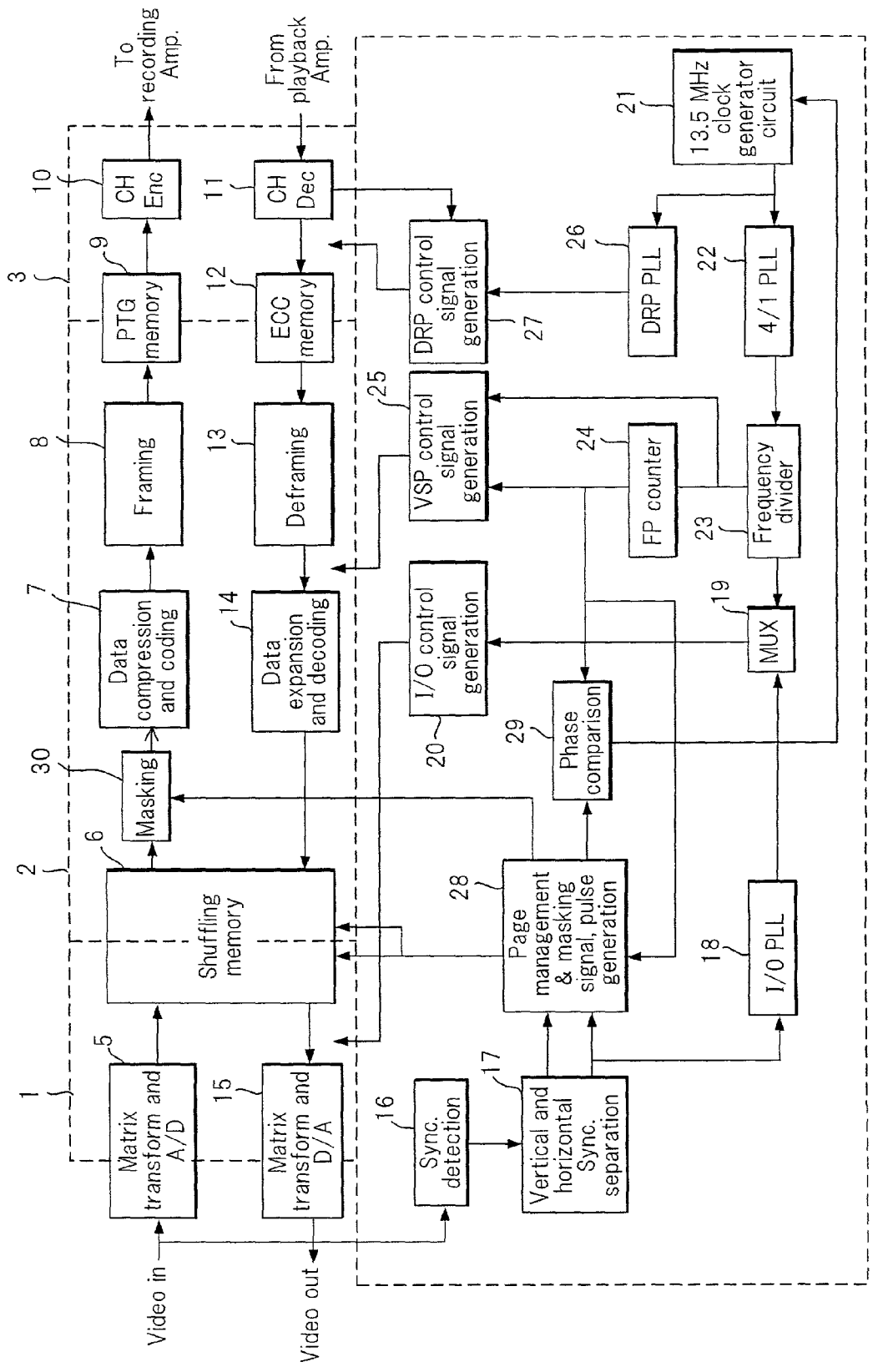
FIG. 1 is a block diagram showing a recording and reproducing apparatus according to the present invention.

FIG. 1 is a diagram showing one example of a circuit of a recording and reproducing apparatus used in the present embodiment. In FIG. 1, 1 designates an I/O block, 2 a VSP block, 3 a DRP block, 4 a control block, 5 an input video signal processing circuit, 6 a shuffling memory, 7 an orthogonal transformation circuit, 8 a framing circuit, 9 a PTG memory, 10 an encoder, 11 a decoder, 12 an ECC memory, 13 a deframing circuit, 14 an inverse orthogonal transformation circuit, 15 an output video signal processing circuit, 16 a synchronization separator circuit, 17 a vertical and horizontal synchronization separator circuit, 18 an I/O PLL circuit, 19 a multiplexer, 20 an I/O control signal generator circuit, 21 a 13.5 MHz clock generator circuit, 22 4/1 PLL circuit, 23 a frequency divider, 24 a frame pulse generating counter, 25 a VSP control signal generator circuit, 26 a DRPPLL circuit, 27 a DRP control signal generator circuit, 28 an external input control circuit, 29 a phase comparator and 30 a data masking circuit.

The recording and reproducing apparatus shown in FIG. 1 is comprised of I/O block 1 (input/output processor) as an input/output portion for handling input and output of video signals, VSP (Video Signal Processing) block 2 (compressing and expanding processor) for effecting predetermined processes on video data, a DRP (Data Recording Playback) block 3 (recording and reproducing processor) for performing recording and reproducing processes for recording and reproduction of video data and control block 4 for generating clock signals required for blocks 1 to 3 and performing the whole control of the apparatus.

The recording and reproducing operations of an externally input, composite signal, for example, in this recording and reproducing apparatus will be described.

To begin with, in control block 4, a synchronizing signal is extracted at synchronization separator circuit 16 from the input composite signal and is supplied to vertical and horizontal synchronization separator circuit 17.

In vertical and horizontal synchronization separator circuit 17, the synchronizing signal is separated into the vertical synchronizing signal and horizontal synchronizing signal. I/OPLL circuit 18, using the horizontal synchronizing signal as a reference signal, forms a 13.5 MHz clock signal which is recommended by the International Telecommunication Union (ITU-R). This clock signal is supplied to I/O control signal generator circuit 20 via multiplexer 19. In I/O control signal generator circuit 20, an I/O control signal is formed and supplied along with the 13.5 MHz clock signal to I/O block 1.

The vertical synchronizing signal is used in external input control circuit 28 as a reference for generation of a frame pulse as an external input synchronizing signal when the frame length of the video signal is standard. When the frame length of the video signal is of anon-standard frequency, an internal free-running synchronizing signal from a free-running counter is used as a reference to generate a frame pulse. The generated frame pulse is supplied to phase comparator 29.

In 13.5 MHz clock generator circuit 21, a clock signal of 13.5 MHz is formed and supplied to 4/1PLL circuit 22 and DRPPLL circuit 26. In 4/1PLL circuit 22, the 13.5 MHz clock signal is multiplied by 4 so as to create a 54 MHz clock signal and this is supplied to frequency divider 23. In frequency divider 23, the 54 MHz clock signal is divided by 3 so as to create a 18 MHz clock signal and this is supplied to FP counter 24 and VSP control signal generator circuit 25.

In FP counter 24, a frame pulse is generated based on the counts of the 18 MHz clock signal, and is supplied to VSP control signal generator circuit 25, phase comparator 29 and external input control circuit 28. In phase comparator 29, the frame pulse from FP counter 24 and the reference frame pulse input from external input control circuit 28 are compared. The result is supplied to 13.5 MHz clock generator circuit 21 so as to perform control the signals into phase. In VSP control signal generator circuit 25, the 18 MHz clock signal from frequency divider 23 and a VSP control signal generated based on the frame pulse from FP counter 24 are supplied along with the 18 MHz clock signal to VSP block 2. In external input control circuit 28, a page control signal for the shuffling memory and a masking signal are generated and supplied to VS block 2.

In DRPPLL circuit 26, the 13.5 MHz clock signal from 13.5 MHz clock generator circuit 21 is multiplied by 31/10 to form a 41.85 MHz clock signal, which is supplied to DRP control signal generator circuit 27. In DRP control signal generator circuit 27, based on the 41.85 MHz clock signal, a DRP control signal is generated, which is supplied together with the 41.85 MHz clock signal to DRP block 3.

Next, in I/O block 1, the input composite signal is sampled and digitized by input video signal processing circuit 5 and further shaped into luminance data Y and chrominance data C. These signals are then written into shuffling memory 6 based on the 13.5 MHz clock signal supplied from control block 4 in accordance with the page management from external input control circuit 28.

In VSP block 2, based on the 18 MHz clock signal supplied from control block 4, the video data is read out from shuffling memory 6 in accordance with the page management from external input control circuit 28. The readout data is masked in data masking circuit 30 in accordance with the masking signal from external input control circuit 28. Then the data is data compressed through orthogonal transformation circuit 7 and shaped into video data of one picture frame by framing circuit 8, which is added with the parity and written into PTG memory 9.

In DRP block 3, the video data is read out from PTG memory 9 based on the 41.85 MHz clock signal supplied from control block 4 and subjected to predetermined coding processes by encoder 10 and output to the recording head (not shown).

Next, the playback operation of this recording and reproducing apparatus will be described.

First, in control block 4 the 13.5 MHz clock signal generated from 13.5 MHz clock generator circuit 21 is multiplied by 31/10 in DRPPLL circuit 26 to form a 41.85 MHz clock signal, which is supplied to DRP control signal generator circuit 27. In DRP control signal generator circuit 27, based on the 41.85 MHz clock signal, a DRP control signal is generated and supplied together with the 41.85 MHz clock signal to DRP block 3. In DRP control signal generator circuit 27, the capstan speed is controlled based on the pilot signal supplied from the reproducing head (not shown) via decoder 11 and recorded on the tape. That is, this allows the playback head to trace the recording track exactly, hence, it is possible to reproduce the video data correctly.

The 13.5 MHz clock signal generated from 13.5 MHz clock generator circuit 21 is supplied to 4/1PLL circuit 22, where the signal is multiplied by 4 so that a 54 MHz clock signal is generated and supplied to frequency divider 23. In frequency divider 23, the 54 MHz clock is divided by 3 to generate a 18 MHz clock signal, which is supplied to FP counter 24 and VSP control signal generator circuit 25. In FP counter 24, a frame pulse, based on the counts of the 18 MHz clock signal, is generated and supplied to VSP control signal generator circuit 25.

In VSP control signal generator circuit 25, the 18 MHz clock signal from frequency divider 23 and the VSP control signal generated based on the frame pulse from FP counter 24 are supplied together with the 18 MHz clock signal to VSP block 2.

In frequency divider 23, the 54 MHz clock signal is divided by 4 into a 13.5 MHz clock signal, which is supplied via multiplexer 19 to I/O control signal generator circuit 20. In I/O control signal generator circuit 20, I/O control signal is formed and supplied together with 13.5 MHz clock signal to I/O block 1.

In DRP block 3, the video data reproduced by the playback head (not shown) is supplied to decoder 11, where the data is subjected to the predetermined decoding process, and the decoded data is written into ECC memory 12 based on the 41.85 MHz clock signal from control block 4 whilst being error-corrected.

In VSP block 2, the video data is read out from ECC memory 12 based on the 18 MHz clock signal supplied from control block 4, and is supplied via deframing circuit 13 to inverse orthogonal transformation circuit 14, where the data is subjected to inverse orthogonal transformation based on the VSP control signal, and is written based on the 18 MHz clock signal into shuffling memory 6 so that one frame of video data will be formed.

In I/O block 1, the video data is read out from shuffling memory 6 based on the 13.5 MHz clock signal supplied from control block 4 and is transformed into the composite data through output video signal processing circuit 15 based on I/O control signal whilst being converted into analog form and is output externally.

Now, external input control circuit 28 will be described in further detail.

Figure 2:
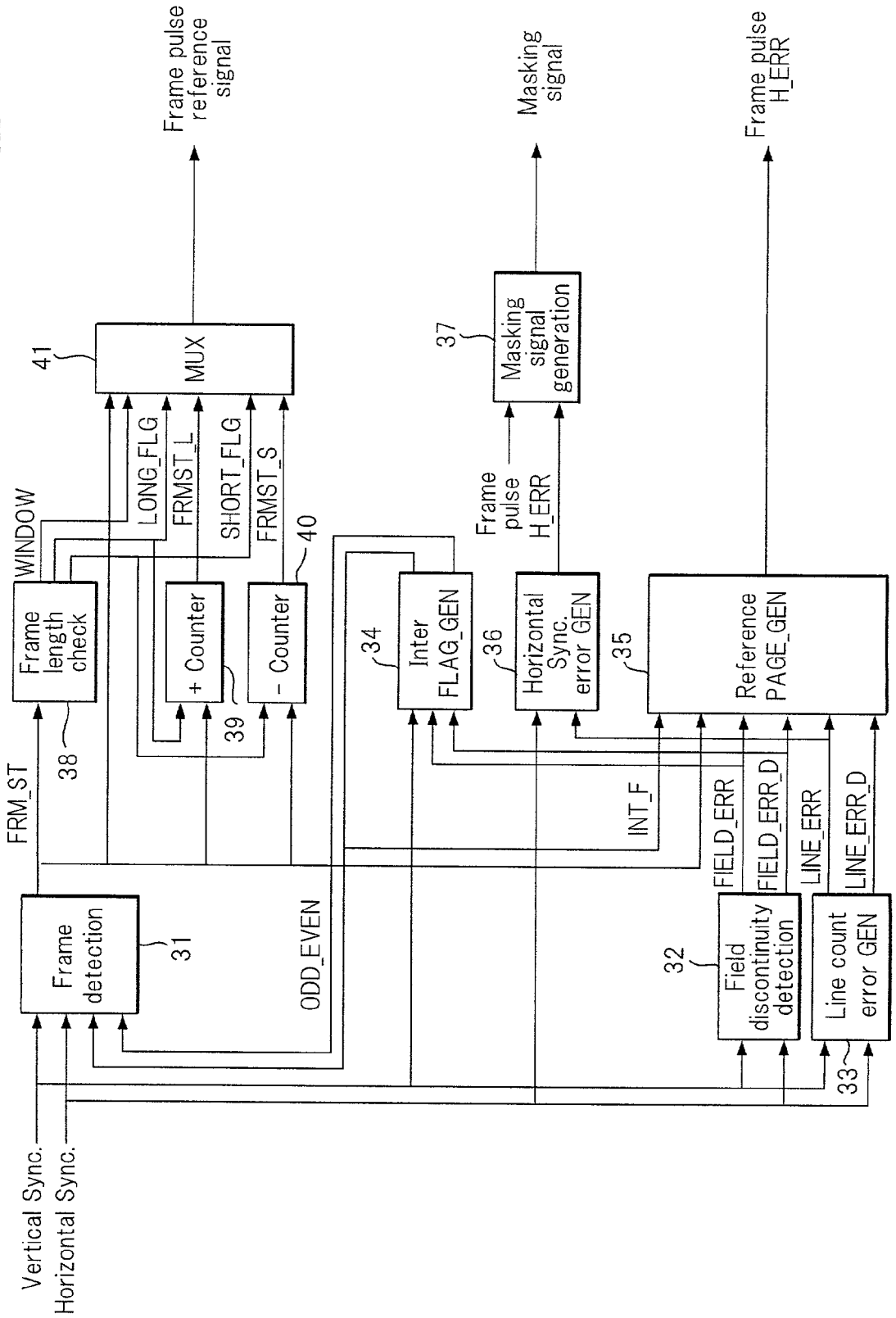
FIG. 2 is a block diagram showing, in detail, an external input control circuit of a recording and reproducing apparatus according to the present invention.

FIG. 2 is a block diagram showing, in detail, external input control circuit 28. In FIG. 2, 31 designates an external synchronizing signal processing circuit, 32 a field discontinuity detecting circuit, 33 a line count error detecting circuit, 34 an interlace/non-interlace determining circuit, 35 a reference page generating circuit, 36 a blank detecting circuit, 37 a mask signal generating circuit, 38 a frame length determining circuit, 39 a long-frame reference pulse generator circuit, 40 a short-frame reference pulse generator circuit and 41 a multiplexer.

First, a case where the external input video signal is disordered will be described.

Field discontinuity detecting circuit 32 makes field discontinuity judgement from the input vertical synchronizing signal and horizontal synchronizing signal and also holds the result of the field discontinuity judgement as to the previous field.

Similarly, from the vertical synchronizing signal and horizontal synchronizing signal, line count error detecting circuit 33 determines whether the number of lines in one field meets the predetermined value. If not, the error flag is set. This circuit also holds the line count determination result as to the previous field.

Next, interlace/non-interlace determining circuit 34 checks, field by field, the field discontinuity judgment and the field discontinuity judgement as to the previous field from field discontinuity detecting circuit 32 in accordance with the vertical synchronizing signal, and sets the flag and outputs a 1st/2nd field pseudo-reallocating signal when the number of field discontinuity exceeds a predetermined count. Here, when the field continuity is normalized, the flag is reset only after the number of normal continuity has exceeded a predetermined count.

External synchronizing signal processing circuit 31 detects the start of a frame based on the input vertical synchronizing signal and horizontal synchronizing signal, but detects the start of a frame in accordance with the 1st/2nd field pseudo-reallocating signal when the flag at interlace/non-interlace determining circuit 34 is set.

Based on these results, reference page generating circuit 35 performs page management of the shuffling memory. First, in accordance with the frame start signal from external synchronizing signal processing circuit 31, the page is fixed at the timing of frame start. In the interlaced mode, the reference page is updated only when none of the line count judgment, the previous field line count judgement, the field discontinuity judgement and the previous field discontinuity judgement is of error. In the non-interlaced mode, the reference page is updated only when none of the line count judgement and the previous field line count judgement is of error. Other than the above, the reference page will not be updated and is retained as is. Based on this reference page, at the frame start of the external synchronization, the page to be written in is set by adding 1 to the reference page while the value of the reference page is set as is for the page to be read at the leading edge of the frame pulse.

On the other hand, the masking signal is generated in a manner as follows. When a blank signal is input, no horizontal synchronizing signal comes in. Therefore, blank detecting circuit 36 measures the interval between horizontal signals so as to determine that the input signal is blank when the interval exceeds the predetermined value. This circuit also checks the value of line count judgement from line count error detecting circuit 33 and sets a horizontal synchronizing signal error flag when a decision of blankness has been made or when a line count error has been detected. Masking signal generating circuit 37 checks the horizontal synchronizing signal error flag at the leading edge of a frame pulse and outputs a masking signal when the error flag is continuously kept being set for a predetermined number of times.

Next, a case where the frame length of the external input video signal varies.

Based on the frame start signal from external synchronizing signal processing circuit 31, frame length determining circuit 38 determines the frame length. When the frame is long, the LONG flag is up while the SHORT flag is up when the frame is short. This circuit also generates a window pulse for switching timing. When the LONG flag is up, an internal free-running synchronizing signal, which is longer by the predetermined length than the standard frame length, is created by long-frame reference pulse generating circuit 39 and output from multiplexer 41. When the SHORT flag is up, an internal free-running synchronizing signal, which is shorter by the predetermined length than the standard frame length, is created by short-frame reference pulse generating circuit 40 and output from multiplexer 41. When the frame length is normal with neither LONG flag or SHORT flag up, the frame start signal is output as an external input synchronizing signal from multiplexer 41.

In order to set the external input synchronizing signal in phase with the internal free-running synchronizing signal upon signal switching, the internal free-running counters of long-frame reference pulse generating circuit 39 and short-frame reference pulse generating circuit 40 are reset by the frame start signal when the operation is made based on the external input synchronizing signal. For switching the operation from the internal free-running synchronizing signal to the external input synchronizing signal, phase matching is achieved by restraining the switching by checking the window pulse generated by frame length determining circuit 38 until the internal free-running synchronizing signal appears within the window pulse.

Figure 3:
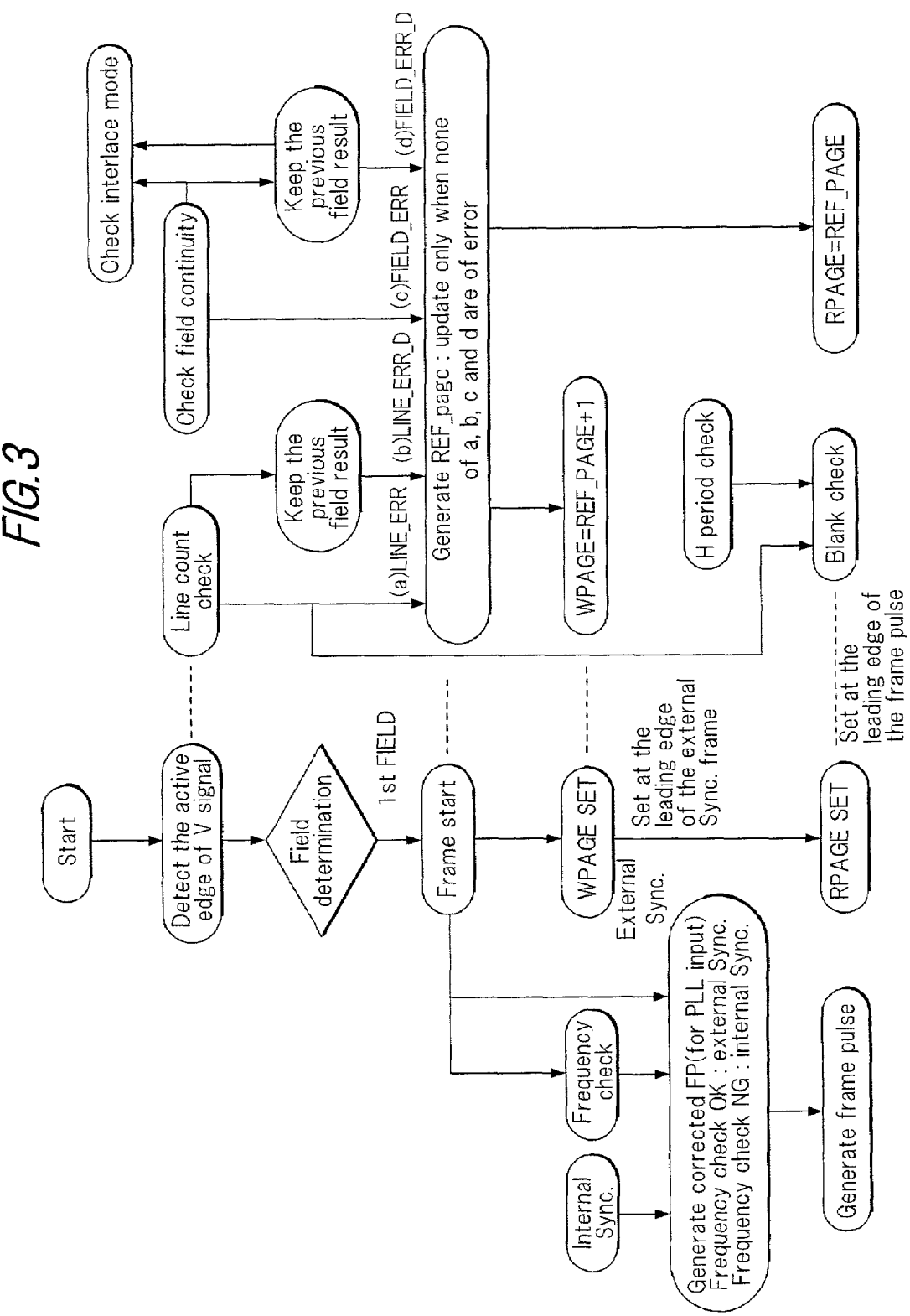
FIG. 3 is a flowchart showing the processing sequence of an external input control circuit of a recording and reproducing apparatus according to the present invention.

The processing flow of the above external input control circuit is shown in FIG. 3.

Referring to FIG. 5, description will be made of how the processing operations as above perform data reading and writing when the external input video data is disordered.

FIG. 5(*a*) shows a case where field discontinuity (the 1st fields appearing in series) occurs due to a scene connection or the like. In FIG. 5(*a*), since the first field of A2 is detected by field detection after writing of the first field of A1, field discontinuity occurs so that the field error flag is set and the page A to be written in and the page C to be read out are retained. That is, the data of A2 is overwritten on the page A on which only the first field data of A1 has been written in, and page retention is released after the previous field error flag is reset so that the data of A2 is read out and normalized video data is output.

Although not illustrated, when the second fields appear in series, normalized video data is output by retaining appropriate pages in the same manner.

Next, FIG. 5(b) shows a case where the operation is switched from the interlaced mode to the non-interlaced mode (having the first fields only). In FIG. 5(b), since the first field of A2 is detected by field detection after writing of the first field of A1, field discontinuity occurs so that the field error flag is set and the page A to be written in and the page C to be read out are retained.

However, since the first field of A3 is detected by field detection after writing of the first field of A2 and the first fields are successively detected downward, the field error flag is kept up. The field discontinuity count is reset when the field error flag is set up and counts up while both the field error flag and the previous field error flag are up so as to count how many times the field error has continued. When the field error has continued for a predetermined number of times (four times in the figure), the non-inter flag is set to generate a pseudo-field reallocating signal, whereby the pseudo-first field and pseudo-second field of A7 are written in. Thereafter, page retention is released so that data B7 and the following data are sequentially written in while A7 and the following are read out after readout of C0, so that normalized video data is output.

The same operation is carried out for the non-interlaced process for the second fields only. Although not illustrated, where the operation is switched from the non-interlaced mode to the interlaced mode, the non-inter flag is reset when the count of successive releasing of the field errors reaches a predetermined number of times. Then the pages are retained until the switching is completed, so that normalized video data is output.

Next, FIG. 5(c) shows a case where the number of lines has varied (reduced). In FIG. 5(c), the number of lines in the first field of A1 is determined to be lower than the predetermined value, so that the line count error flag is set and the page A to be written in and page C to be read out are retained. Data of A2 is written over the page A on which data of A1 with an insufficient number of lines has been written in, and page retention is released after the reset of the previous field error flag so that data of A2 is read out. Thus, normalized video data is output. Though not illustrated, when the number of lines has increased, normalized video data will be output by retaining appropriate pages in the same manner.

Next, FIG. 5(d) shows a case of blank input. Blank input, which generally lacks input synchronizing signals, is considered to be classified into three cases: the first case where the vertical synchronizing signal does not come in, the second case where the horizontal synchronizing signal does not come in and the third case where neither the vertical synchronizing signal nor the horizontal synchronizing signal comes in. FIG. 5(d) shows the case where the vertical synchronizing signal does not come in. In FIG. 5(d), the vertical synchronizing signal stops coming in while the first field of A1 is being written in. In this case, however, the horizontal synchronizing signal continues making its function, so that the count of lines is determined to be greater than the predetermined value. Therefore, the line count error flag is set and the page A to be written in and page C to be read out is retained.

Then, the horizontal synchronization error flag which is given by logical OR between the line count error flag and the horizontal synchronizing signal frequency error flag (not shown) is set. Since the line count error flag is kept up downward, the horizontal synchronization error flag also remains being set. The horizontal synchronization error count is reset when the horizontal synchronization error flag is set and counts up while both the horizontal synchronization error flag and the previous frame horizontal synchronization error flag are up so as to count the number of times the horizontal synchronization error has continued. When the horizontal synchronization error has continued for a predetermined number of times (four times in the figure), the BLANK flag is set to mask the readout data with a black mute signal, for example.

Although not shown, both the cases where no horizontal synchronizing signal comes in and where neither vertical synchronizing signal nor horizontal synchronizing signal comes in are assumed as a case where no horizontal synchronizing signal comes in. That is, when the horizontal synchronizing signal stops coming in, the horizontal synchronizing signal frequency error signal (not shown) is set so that the horizontal synchronization error flag which is given by logical OR between the line count error flag and the horizontal synchronizing signal frequency error flag becomes set. Thereafter, the operation is followed in the same manner as above by counting the number of times the horizontal synchronization error has continued. When the horizontal synchronization error has continued for a predetermined number of times, the BLANK flag is set to mask the readout data.

As has been described heretofore, video data can be recorded based on the internal free-running synchronizing signal when the vertical synchronizing signal in the external input video data does not appear at the standard frequency during recording and can be recorded based on the external input synchronizing signal when it appears at the standard frequency. It is also possible to perform switching between the external input synchronizing signal and the internal free-running synchronizing signal without causing any phase jump. Further, use of a shuffling memory for three frames makes it possible to avoid mixture of data within one frame, and management of frame pages and forcible masking of video data make it possible to output normal video data even if the external input video data has been disordered.

INDUSTRIAL APPLICABILITY

According to the present invention, use of a shuffling memory for three frames as in the manner described above makes it possible to perform normal recording by avoiding mixture of frame data. Further, even if the synchronizing signal of external input video data such as a composite signal etc., is disordered, the irregularity of the external input synchronizing signal is detected so as to make management of frame pages in the shuffling memory for three frames and perform forced masking of video data, thus making it possible to record normalized video data. Therefore, it is possible to provide a recording and reproducing apparatus which is improved in image quality in the recording mode.

Further, since the external input synchronizing signal and the internal free-running synchronizing signal can be switched smoothly, this enables accurate drum servo control on the rotational rate of the recording head, thus leading faithful recording of an input signal.

The invention claimed is:
1. A recording and reproducing apparatus for recording and reproducing digital video signals, comprising:
a memory for at least three frames;

a writing means for writing externally input video data into the memory based on the synchronizing signal of the digital video signal;

a first readout means for reading video data from the memory based on the synchronizing signal;

a second readout means for reading video data from the memory based on a free-running synchronizing signal generated separately; and a page management moans for performing management of frame pages in the memory by at least controlling the timing of writing video data into the memory and the timing of readout, based on the synchronizing signal, wherein the first readout means and second readout means are switched over from one to another in accordance with the instruction from the page management means.

2. The recording and reproducing apparatus defined in claim 1, wherein the page management means comprises: a frame length detecting means for detecting the difference of the frame length of the synchronizing signal from the predetermined standard value; a first internal counter for generating the first frame reference signal, which is greater than the standard value; a second internal counter for generating the second frame reference signal, which is shorter than the standard value; and a window pulse generator for generating a window pulse based on the synchronizing signal, and when the detection result of the frame length detecting means shows that the frame length agrees with the standard value, the first readout means reads out video data from the memory;

when the frame length is greater than the standard value, the second readout means using the first frame reference signal, reads out video data from the memory;

when the frame length is shorter than the standard value, the second readout means using the second frame reference signal, reads out video data from the memory;

when the operation is switched from the first readout means to the second readout means, the first internal counter and second internal counter are reset; and switching from the second readout means to the first readout means is performed when the first frame reference signal or the second frame reference signal appears within the window pulse.

3. The recording and reproducing apparatus defined in claim 1, wherein the page management means comprises: a field determination means for determining the fields; and a discontinuity detecting means for detecting a discontinuity between fields, and when the discontinuity detecting means detects a field discontinuity in the fields determined by the field determining means, the page to be written in and the page to be read out in the memory are retained.

4. The recording and reproducing apparatus defined in claim 1, wherein the page management means comprises: a line count detecting means for detecting the number of lines in one frame, and when the line count detected by the line count detecting means differs from the previously set number of lines, the page to be written in and the page to be read out are retained.

5. The recording and reproducing apparatus defined in claim 1, wherein the means for detecting a blanked period of the externally input digital video signal; and a masking means for forcibly muting the video signal read out from the memory when the blank detecting means detects a blanked period.

6. The recording and reproducing apparatus defined in claim 1, wherein the page management means comprises: an interlace mode determining means for determining whether the externally input digital video signal is of interlaced or non-interlaced; and a field reallocating means which, when the interlace mode determining means has determined the externally input digital video signal to be of non-interlaced data, effects field reallocation to convert the data into interlaced format.

7. The recording and reproducing apparatus defined in claim 1, wherein when the determined result from the interlace mode determining means changes, the contents in the page to be written in and in the page to be read out in the memory are retained.

8. The recording and reproducing apparatus defined in claim 6, wherein when the determined result from the interlace mode determining means changes, the determined result is monitored for a previously determined period of time while the contents in the page to be written in and in the page to be read out in the memory are retained, and retention of the page to be written in and the page to be road out in the memory is released when the determined result has been confirmed after completion of the predetermined period of time.

* * * * *